United States Patent
Laturner

(10) Patent No.: US 9,343,896 B2
(45) Date of Patent: May 17, 2016

(54) SAFETY CIRCUIT ARRANGEMENT AND METHOD FOR THE FAIL-SAFE MONITORING OF A MOVEMENT VARIABLE

(75) Inventor: Andre Laturner, Leonberg (DE)

(73) Assignee: PILZ GMBH & CO. KG, Ostfildern (DE)

( * ) Notice: Subject to any disclaimer, the term of this patent is extended or adjusted under 35 U.S.C. 154(b) by 953 days.

(21) Appl. No.: 13/473,677

(22) Filed: May 17, 2012

(65) Prior Publication Data

US 2012/0268107 A1    Oct. 25, 2012

Related U.S. Application Data

(63) Continuation of application No. PCT/EP2010/068021, filed on Nov. 23, 2010.

(30) Foreign Application Priority Data

Nov. 23, 2009 (DE) .................. 10 2009 055 991
Nov. 30, 2009 (DE) .................. 10 2009 057 196

(51) Int. Cl.
G01P 3/56 (2006.01)
H02H 7/08 (2006.01)
G05B 9/02 (2006.01)
G01D 5/244 (2006.01)

(52) U.S. Cl.
CPC ......... *H02H 7/0844* (2013.01); *G01D 5/24461* (2013.01); *G05B 9/02* (2013.01)

(58) Field of Classification Search
CPC ........... G01R 27/2605; G01R 31/1272; G01R 31/2601
See application file for complete search history.

(56) References Cited

U.S. PATENT DOCUMENTS 4,563,625 A  *  1/1986  Kornbrekke et al. ......... 318/603
4,902,970 A      2/1990  Suquet (Continued)

FOREIGN PATENT DOCUMENTS

DE    35 41 852 A1    6/1987
DE   100 35 783 A1    2/2001

(Continued)

OTHER PUBLICATIONS

CEI IEC 61508-2; International Standard; Functional safety of electrical/electronic/programmable electronic safety-related systems—Part 2: Requirements for electrical/electronic/programmable electronic safety-related systems; May 2000; 152 pp.

(Continued)

*Primary Examiner* — Alesa Allgood
(74) *Attorney, Agent, or Firm* — Harness, Dickey & Pierce, P.L.C.

(57) ABSTRACT

A safety circuit arrangement for the failsafe monitoring of a movement variable of a moving machine part has a signal input for supplying an encoder signal, with the encoder signal being representative of the movement variable to be monitored. The arrangement also has a reference signal path for supplying a reference signal, a tap connected to the signal input and to the reference signal path in order to provide a superposition signal by superposing the reference signal on the encoder signal, and a measuring unit which is connected to the tap and is designed to detect whether the superposition signal reaches at least one predefined signal level or is within a predefined signal level range.

14 Claims, 4 Drawing Sheets

(56) References Cited

U.S. PATENT DOCUMENTS

| | | |
|---|---|---|
| 6,591,217 B1 | 7/2003 | Baur et al. |
| 6,615,152 B2 | 9/2003 | Fujimoto et al. |
| 7,256,712 B2 * | 8/2007 | Fujita ............................. 341/1 |
| 7,378,815 B2 | 5/2008 | Losch et al. |
| 7,593,205 B2 * | 9/2009 | Veil ............................. 361/93.1 |
| 8,183,456 B1 * | 5/2012 | Schroeder et al. ............ 136/200 |
| 2004/0061494 A1 * | 4/2004 | Koike et al. ................... 324/174 |
| 2006/0164075 A1 * | 7/2006 | Niwa ....................... 324/207.16 |
| 2006/0209932 A1 * | 9/2006 | Khandekar et al. .......... 375/148 |
| 2007/0146169 A1 | 6/2007 | Otsuka et al. |
| 2008/0165464 A1 | 7/2008 | Veil |
| 2008/0255796 A1 | 10/2008 | Takeuchi |
| 2008/0298784 A1 | 12/2008 | Kastner |
| 2010/0201373 A1 | 8/2010 | Sato et al. |

FOREIGN PATENT DOCUMENTS

| | | |
|---|---|---|
| DE | 101 63 010 A1 | 11/2002 |
| DE | 10 2005 030 276 A1 | 12/2006 |
| DE | 10 2005 045 284 A1 | 3/2007 |
| JP | 2000-50664 | 2/2000 |
| JP | 2000-234942 | 8/2000 |
| JP | 2001-241972 | 9/2001 |
| JP | 2002-372437 | 12/2002 |
| JP | 2006-284419 | 10/2006 |
| JP | 2007-191805 | 8/2007 |
| JP | 2007-234741 | 9/2007 |
| JP | 2009-116207 | 5/2009 |
| JP | 2010-266260 | 11/2010 |
| WO | WO 01/11375 A1 | 2/2001 |

OTHER PUBLICATIONS

The International Bureau of WIPO; International Preliminary Report on Patentability (Chapter 1); Jun. 12, 2012; 8 pp.

Examination Report (with English language translation) for corresponding Japanese case dated Mar. 31, 2015; 7 pp.

* cited by examiner

SAFETY CIRCUIT ARRANGEMENT AND METHOD FOR THE FAIL-SAFE MONITORING OF A MOVEMENT VARIABLE

CROSS-REFERENCES TO RELATED APPLICATIONS

This application is a continuation of international patent application PCT/EP2010/068021 filed on Nov. 23, 2010 designating the U.S., which international, patent application has been published in German language and claims priority from German patent applications DE 10 2009 055 991.4 filed on Nov. 23, 2009 and DE 10 2009 057 196.5 filed on Nov. 30, 2009. The entire contents of these priority applications are incorporated herein by reference.

BACKGROUND OF THE INVENTION

The present invention relates to a safety circuit arrangement, a monitoring device comprising a plurality of such safety circuit arrangements and a method for the failsafe monitoring of a movement variable of a moving machine part, in particular for the failsafe monitoring of a rotational speed and/or a rotational position.

The invention particularly relates to the failsafe evaluation of a rotational speed sensor for the protection of a danger area on an automatically operating installation, such as a machine tool, a robot, a conveyor belt or an automatically opening and closing door. Danger areas of such machines or installations are frequently protected by protective fences, light barriers and other devices, so that direct access to the danger area is prevented and/or the installation is shut down when the danger area is entered. However, there are cases in which access to a danger area of an installation cannot be entirely prevented, such as when setting up an automated operating sequence on a machine or an automatic door. To minimize the risk of injury to people, it is known practice for movement variables for the relevant drives, such as the rotational speed and/or the torque of a drive or the speed and/or the force of a moving part of an installation, to be limited to a defined maximum value. By way of example, a machine tool can thus be operated at a reduced, limited speed when a protective door is open. In order to ensure the safety of people in these situations, the dangerous movement variables of the operating drive need to be monitored in a failsafe manner.

Failsafe monitoring is usually implemented by monitoring the relevant variables at least twice and comparing the respective results with one another. In this case, the dangerous movement of the machine or installation is permitted only when and for as long as the redundant measurement results for the dangerous movement variable correspond. In addition, failsafe monitoring is achieved by mutually independent evaluation systems which evaluate one or more measured variables.

DE 100 35 783 A1 discloses a monitoring device for monitoring a rotational speed for a synchronous or asynchronous motor, wherein the rotational speed is detected by means of a rotational speed sensor and is compared with the target rotational speed, and additionally drive currents for the electric motors are measured and are compared with target values that are to be expected. A plausibility comparison between the measured rotational speeds and the measured drive currents allows the rotational speed of the relevant synchronous or asynchronous machine to be monitored redundantly.

DE 101 63 010 A1 discloses a circuit for the failsafe monitoring of a speed for an electrical drive, in which two independent systems monitor measured variables for the electrical drive. The first monitoring unit performs the monitoring by using estimated or measured rotational speed values, with the second monitoring unit taking motor current values or reconstructed voltages and ascertaining therefrom a measured variable for determining the speed of the electrical drive. The two independent monitoring units are connected to one another by means of a communication line and perform a plausibility comparison for the monitoring results.

DE 10 2005 045 284 A1 discloses a rotational speed monitoring device in which two independent control units compare the currents from two motor phases with the voltages from the same motor phases. In addition, the total current from all motor phases is also detected and the rotational speed is ascertained from the ripple in the detected signal. This allows the detection of errors in the monitoring systems.

The known methods and apparatuses are all very specifically directed to the available variables and sensors representing the movement, such as the rotational speed of a drive. However, there are a large number of different sensors which are able to deliver very different signals. By way of example, there are incremental rotary encoders which deliver two different square-wave signals, each having a plurality of square-wave pulses. From the number of pulses and the phase of the signals relative to one another, it is possible to determine the rotational speed and the direction of rotation. The levels of the signals are frequently TTL levels in these cases. However, there are also incremental encoders which deliver signals having HTL levels, i.e. the voltage levels are substantially higher than in the case of TTL signals. Furthermore, there are rotary encoders which deliver analog sine and/or cosine signals, such as resolvers. In this case too, the amplitudes can vary depending on the sensor used. Furthermore, there are specific sensor interfaces which use yet other signals, such as Hyperface®. To date, a monitoring device which evaluates the signals from the rotary encoders needs to have been selected and implemented on the basis of the rotary encoder type used, in each case. It would be desirable to have a monitoring device which can be inexpensively combined with a plurality of different sensor types and which is also compact.

SUMMARY OF THE INVENTION

Against this background, it is an object of the present invention to provide a method and an apparatus which allow failsafe monitoring of a movement variable on an installation for a plurality of different sensors for capturing the movement variable.

According to an aspect of the invention, there is provided a safety circuit arrangement for failsafe monitoring of a movement variable of a moving machine part, the arrangement comprising a signal input for supplying an encoder signal which is representative of the movement variable to be monitored, comprising a reference signal path for supplying a reference signal, comprising a first tap which is connected to the signal input and to the reference signal path in order to provide a superposition signal by superposing the reference signal on the encoder signal, and comprising a measuring unit which is connected to the first tap and is designed to determine whether the superposition signal reaches at least one predefined signal level or is within a predefined signal level range.

According to another aspect, there is provided monitoring device for the failsafe monitoring of a movement variable of a moving machine part, comprising a first safety circuit arrangement and at least one second safety circuit arrangement, and evaluation circuit, with the first and second safety circuit arrangements each comprising a signal input for supplying an encoder signal which is representative of the movement variable to be monitored, a reference signal path for supplying a reference signal, a tap which is connected to the signal input and to the reference signal path in order to provide a superposition signal by superposing the reference signal on the encoder signal, and a measuring unit which is connected to the tap and is designed to determine whether the superposition signal reaches at least one predefined signal level or is within a predefined signal level range, wherein the measuring circuits are configured to generate an error signal on the basis of the superposition signal, and with the evaluation circuit being configured to determine the movement variable.

According to yet another aspect, there is provided a method for failsafely monitoring a movement variable of a moving machine part, comprising the steps of providing an encoder signal, which is representative of the movement variable to be monitored; producing a superposition signal by superposing a reference signal onto the encoder signal; and checking whether the superposition signal reaches at least one predefined signal level or is within a predefined signal level range.

The novel safety circuit arrangement, monitoring device and method are based on the idea of superposing a defined, individual reference signal on an encoder signal, which is supplied to the safety circuit arrangement at an input, preferably even before the actual signal evaluation. Advantageously, the reference signal is a DC voltage, i.e. the encoder signal has a DC voltage superposed on it. As a result, encoder signals having different signal levels can be processed and checked for plausibility. The encoder signal itself may have different signal levels which can be transformed to a desired level range by the reference signal. If the encoder signal is present without error, the superposition signal formed by the sum of the encoder signal and the reference signal has a particular signal level which, when measured, differs significantly from an erroneous encoder signal or from an absent encoder signal. The signal level which needs to be reached by the superposition signal differs significantly from the encoder signal alone, from an erroneous encoder signal and from the reference signal. As a result, the new safety circuit arrangement and the method allow safe recognition of an error in the connected encoder and an error during the signal transmission, e.g. owing to a cable fracture, and consequently generation of an error signal and intervention in the control of the machine part or possibly interruption of the movement of the machine part.

For this reason, the safety circuit arrangement, the monitoring device and the method are particularly suitable for processing a movement variable of a moving machine part and particularly a rotational speed, captured by an arbitrary sensor and particularly by a rotational speed sensor, and for monitoring these in inexpensive and failsafe fashion.

In particular, the present invention can be used to increase the level of diagnostic coverage pursuant to IEC 61508.

Preferably, the encoder signal has an AC signal component.

The AC signal component results in signal dynamics which can be monitored very easily for errors, such as a short in the signal line. The AC signal component of the encoder signal may be any desired AC signal, such as a square-wave signal, a pulse signal, or one or more sine signals. Within the context of the invention, the measured variable can be transmitted in any component of the encoder signal, such as in the AC signal component, in a constant or DC signal component or in the relationship between different signal components.

The signal level range may advantageously be unilaterally or bi-laterally limited, that is to say by a maximum level or a minimum level or by a maximum level and a minimum level.

In a preferred refinement, the signal level or the signal level range is defined by an upper threshold value and a lower threshold value, or the signal level range is defined by an upper maximum level and a lower minimum level. This means that the superposition signal must reach both the upper threshold value and the lower threshold value or must be within the signal level range in order to accept it as an error-free signal. If the encoder signal has an AC signal component, the two threshold values can be used to check whether the encoder signal has an erroneous AC signal component or whether it is merely a constant signal, which would be attributable to an error in the encoder or to a line fracture, for example. The threshold values are preferably set such that the positive edge of the superposition signal reaches or passes through the upper threshold value and, within the same period, the negative or falling edge of the superposition signal reaches or passes through the lower threshold value. If the encoder signal has merely a DC component, the maximum level and the minimum level can be used to check whether the superposition signal is in the signal level range.

In addition, it is advantageous if the measuring unit is designed to generate an error signal if the predefined signal level is not reached or the superposition signal is not within the signal level range.

This refinement makes it a simple matter to shut down the drive if the monitored encoder signal does not have the expected properties or the properties which are usual for an error-free encoder signal.

Preferably, the measuring unit is designed to generate an error signal if the upper and lower threshold values are not reached alternately and preferably within a defined period of the AC signal component.

This makes it possible to reliably check whether an error-free encoder signal is being supplied, whether it has a correct amplitude, and in particular it is possible to safely recognize an error in the encoder such as a "stuck-at-high" or "stuck-at-low" error.

In this case, it is preferred if the generated error signal is designed to influence the movement variable for the machine part. This allows any recognized error to trigger an intervention in the movement of the dangerous machine part and assurance of the necessary safety.

In addition, it is preferred if the measuring unit has an analog comparator.

An analog comparator can be used to adjust the threshold values, particularly threshold voltages, with little effort, e.g. by providing comparison voltages, which are preferably applied to the analog comparator, and this makes it possible to quickly detect and check when one of the threshold values is reached using a single comparator output signal.

In addition, it is preferred if the threshold values are each monitored by at least one analog comparator. As a result, the threshold values can be adjusted independently of one another and the signals from the comparators can be evaluated independently of one another.

In addition, it is advantageous if the measuring unit has at least one analog/digital converter device. This allows the superposition signal to be checked by a digital evaluation unit.

In addition, it is preferred if the encoder signal is a kind of a pulsed signal.

This allows to monitor TTL encoders, HTL encoders or other initiators for measuring the movement variable.

Alternatively, the encoder signal is a kind of a sinusoidal signal.

This makes it easily possible to monitor sin/cos encoders in failsafe fashion by the safety circuit arrangement.

For the safety circuit arrangement, it is preferred if the reference signal and/or at least one of the threshold values or the signal level range is automatically adjustable by means of a control unit.

As a result, it is possible to connect any desired encoder to the safety circuit arrangement without the need for deep intervention in the circuit control. This also helps to avoid human errors when setting up the circuit arrangement.

In addition, it is preferred if the reference signal and/or at least one of the threshold values or the signal level range is manually adjustable.

This allows individual adjustment of individual requirements, for example in relation to the sensitivity or the reaction speed of the safety circuit arrangement, for each encoder.

In one preferred refinement, the tap is connected to an evaluation unit for determining the movement variable.

This refinement not only allows the safety circuit arrangement to be used for the failsafe monitoring of the encoder signal itself, but also allows the encoder signal to be quantitatively evaluated and, by way of example, the measured speed or the measured rotational speed can be made available to a subsequent controller.

In one preferred refinement, the evaluation unit has a differential amplifier.

The use of the differential amplifier allows to suppress or filter interference signals in the superposition signal, for example caused by connected components, electromagnetic interference signals or common mode interference. The signal that has undergone such interference rejection can then be reliably evaluated.

In a further refinement, the tap is connected to an input of the differential amplifier, with a further input of the differential amplifier being connected to a further signal line in order to supply the differential amplifier with a further encoder signal, particularly an inverted encoder signal.

This refinement allows a plausibility comparison, because the inverted encoder signal is likewise provided by the signal transmitter, and hence a further measured variable is used to check the failsafety. In addition, this circuit arrangement allows signal components, such as DC voltage components, to be filtered in order to allow simpler evaluation of the measured variable.

In one preferred refinement, the evaluation unit has a quadrature evaluation section.

In this refinement, output signals from different differential amplifiers to which various encoder signals are supplied are preferably evaluated by a quadrature evaluation circuit. The particular advantage of this evaluation method is that it can be performed with a high level of precision, relatively high rotational speeds can be measured and direction-of-rotation recognition is possible. This quadrature evaluation circuit allows simple and reliable evaluation of an analog signal which represents the movement variable.

In a further refinement, the quadrature evaluation circuit is connected to the output of the differential amplifier and to at least one second safety circuit arrangement, to which a further encoder signal is supplied.

In one preferred refinement, the evaluation unit has two channels which are redundant in respect of one another and which are connected to the output of the differential amplifier.

In this refinement, very reliable evaluation of the encoder signal is possible because a further redundant evaluation circuit is used. Hence, this redundancy contributes to increased failsafety of the novel safety circuit arrangement and of the novel method.

It goes without saying that the features cited above and those which are yet to be explained below can be used not only in the respectively indicated combination but also in other combinations or on their own without departing from the scope of the present invention.

BRIEF DESCRIPTION OF THE DRAWINGS

Exemplary embodiments of the invention are shown in the drawing and are explained in more detail in the description below. In the drawing.

DESCRIPTION OF PREFERRED EMBODIMENTS

Figure 1:
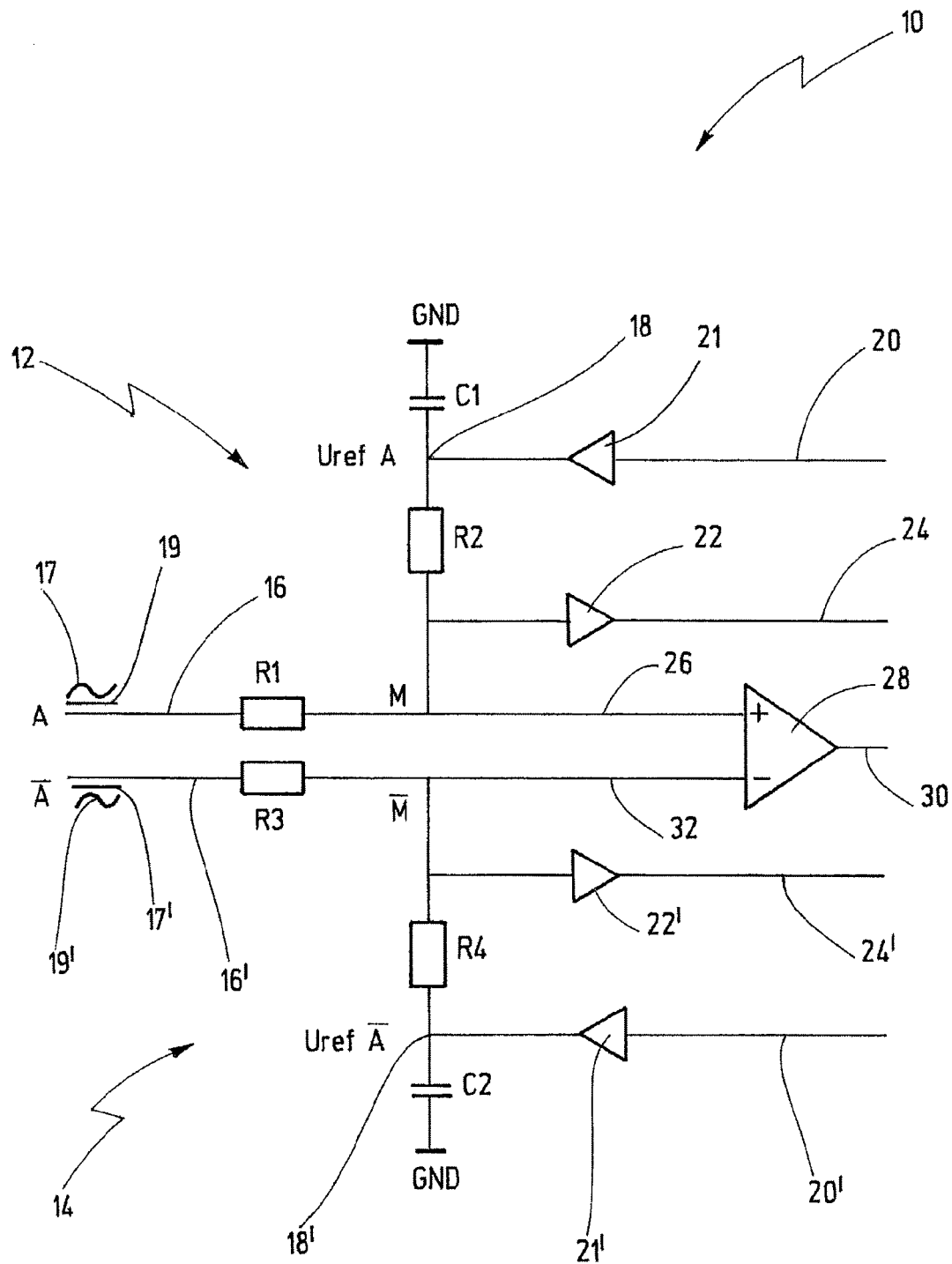
FIG. 1 shows a first exemplary embodiment of a safety circuit arrangement for the failsafe monitoring of an encoder signal.

In FIG. 1, a safety circuit arrangement is denoted by the reference numeral 10 in its entirety.

The safety circuit arrangement 10 has a first safety circuit 12 and a second safety circuit 14. In this preferred case, the safety circuits 12, 14 are of identical design. The safety circuit 12 has an input signal line 16 which is used to supply an encoder signal A to the safety circuit 12. The encoder signal A preferably has an AC signal component 17 which is representative of a movement, for example a rotational movement of a shaft. However, the encoder signal A may also merely have a DC component 19, the level of which is representative of the movement, for example. The encoder signal A may also be a mixed signal comprising an AC signal component 17 and a DC component 19. In any case, the input signal line 16 is here connected to a tap M via a resistor R1. The tap M is connected to a reference voltage point 18 via a resistor R2. The reference voltage point 18 has a reference voltage UrefA applied to it. The reference voltage point 18 is routed to a ground point GND via a capacitor C1. The reference voltage UrefA is supplied to the reference voltage point 18 via a reference voltage path 20. In this case, the reference voltage path 20 has a supply unit which produces the reference voltage UrefA. In this case, the supply unit 21 comprises an operational amplifier 21 which averages the reference voltage UrefA from a pulse-width-modulated signal supplied to the operational amplifier. By way of example, the pulse-width-modulated signal has a duty ratio, which in this case is adjustable from 0%-100%. The pulse-width-modulated signal is preferably produced by an evaluation and control unit in a monitoring device which accommodates the safety circuit arrangement 10, or is supplied to the operational amplifier 21 from the outside via a terminal. As an alternative to the operational amplifier 21, the supply unit may have a digital/analog converter which produces the reference voltage. In this case, the tap M is connected to a measuring unit 22. The measuring unit 22 has an analog comparator in this case. As an alternative or in addition, the measuring unit 22 may have an analog/digital converter. The measuring unit 22 has an output line 24 in order to route an error signal to an evaluation and control unit.

The tap M is connected to a first input 26 of a differential amplifier 28. The differential amplifier 28 has a signal output line 20 in order to route a differential amplifier signal out of the safety circuit arrangement 10.

The safety circuit 14 is designed in the same manner as the safety circuit 12. The safety circuit 14 has an input signal line 16' which is routed to a tap $\overline{M}$ via a resistor R3. The tap $\overline{M}$ is routed to a reference voltage terminal 18' via a resistor R4. The reference voltage point 18' has a reference voltage $\overline{UrefV}$ applied to it. The reference voltage point 18' is connected to a reference voltage line 20', which is used to apply the reference voltage $\overline{UrefA}$ to the reference voltage point 18'. The reference voltage line 20' includes the supply unit 21'. The reference voltage point 18' is routed to the ground point GND via a capacitor C2. The tap $\overline{M}$ is connected to a measuring unit 22', which preferably includes an analog comparator 22'. The measuring unit 22' is connected to an output signal line 24' in order to route a checking signal out of the safety circuit arrangement. The tap $\overline{M}$ is connected to a second differential amplifier input 32 of the differential amplifier 28. In preferred exemplary embodiments, the reference voltages UrefA and $\overline{UrefA}$ can be adjusted separately from one another.

The input signal line 16 is used to supply the safety circuit with a first encoder signal A from a rotary encoder or another movement sensor. The input signal line 16' is used in this case to supply the safety circuit 14 with a second encoder signal $\overline{A}$, which may be inverted in comparison with the encoder signal A. Accordingly, the encoder signal $\overline{A}$ has an AC signal component 17'. Alternatively, the encoder signal $\overline{A}$ has only a DC component 19'. The encoder signal $\overline{A}$ may also be in the form of a mixed signal comprising an AC signal component 17' and a DC component 19'. The encoder signals A, $\overline{A}$ are preferably two output signals from an encoder which captures the movement variable. The encoder thus provides the encoder signal A and, by way of example, the inverted encoder signal $\overline{A}$, the inverted encoder signal $\overline{A}$ having a 180° phase shift in comparison with the encoder signal A. Alternatively, the safety circuit arrangement 10 can be supplied with a DC voltage instead of the inverted encoder signal $\overline{A}$, or no second encoder signal at all can be supplied.

The encoder signal A on the input signal line 16 is routed to tap M via resistor R1. The reference voltage UrefA is supplied at tap M via resistor R2. Since the encoder signal A is routed to the reference voltage UrefA via the resistors R1 and R2, which form a voltage divider, the reference voltage UrefA is superposed on the encoder signal A. The superposition signal has the AC signal component 17 and/or the DC component 19 and also the level of the reference voltage UrefA. The superposition signal formed in this manner can be tapped off at the tap M.

The measuring unit 22 is connected to the tap M in order to monitor the superposition signal in relation to the analog signal values and particularly so as to determine whether the analog signal values are within defined signal ranges and/or exhibit a defined signal behavior. Hence, the measuring unit 22 is used for error checking. By virtue of the reference voltage UrefA being superposed on the encoder signal A at the tap M, it is possible to match different encoder signal levels to the safety circuit 12 and to the measuring unit 22 and the differential amplifier 28, respectively. This allows different encoder types to be checked at one signal input 16 or redundant signal inputs 16/16'. In this case, the measuring unit 22 is particularly designed for checking whether the superposition signal actually has an AC signal component 17 and, if so, whether the superposition signal reaches an upper threshold value and a lower threshold value. The threshold values are set such that the upper threshold value is below the maximum amplitude to be expected for the superposition signal, and the lower threshold value is above the minimum amplitude to be expected for the superposition signal. In the case of an error-free superposition signal, a rising edge of the superposition signal reaches the upper threshold value and, within the same period of the signal, a falling edge of the superposition signal reaches the lower threshold value. A check is preferably performed to determine whether the threshold values are reached alternately in order to achieve increased error detection. If the encoder signal A has only the DC component 19, the measuring unit 22 checks whether the superposition signal is within a predefined value range. If there is a cable fracture on the connecting line between the input 16 and the encoder, the measuring unit 22 merely measures the reference voltage UrefA at the tap M. This reference voltage UrefA is preferably chosen such that it can be evaluated by a single analog measurement and differs significantly from the other voltages in the safety circuit arrangement. It is therefore possible to recognize a cable fracture from the input signal 16 both in the case of AC signals and in the case of DC signals from the encoder.

In addition, two voltage states could generally occur in connection with an error in the encoder. Firstly, the encoder can deliver a constantly high voltage corresponding to the maximum value of the encoder signal A (stuck-at-high), or secondly, a constantly low voltage, which corresponds to the minimum value of the encoder signal A and in the case of a TTL encoder is approximately 0 volts, for example (stuck-at-low). Therefore, the superposition signal will reach the upper threshold value precisely once in the case of a stuck-at-high error in the encoder and will reach the lower threshold value precisely once in the case of a stuck-at-low error in the encoder, and will then remain constant. If the encoder signal A has merely the DC component 19, the superposition signal is outside the predefined range in these two cases and can be recognized as an error. Therefore, all possible error variants can be detected by the measuring unit 22.

Preferably, the measuring unit 22 has an analog comparator in order to monitor the level values of the superposition signal. The threshold voltage of the analog comparator can advantageously be varied and matched, in particular automatically, to the signal levels of the encoder signal by an evaluation and control unit. Depending on the level value of the superposition signal, the analog comparator 22 (or the analog comparator 22') produces an error signal on an output line 24 (or 24') if none of the threshold values are reached by the superposition signal within a defined period. As an alternative or in addition, the measuring unit 22 may have an analog/digital converter in order to determine the level values of the superposition signal, and in these cases the analog/digital converter and a downstream comparison unit produce the error signal.

UrefA and $\overline{UrefA}$ are preferably adjusted such that the AC components 17 of the two resulting superposition signals coincide. In addition, the taps M, $\overline{M}$ are connected to the differential amplifier inputs 26, 32. The differential amplifier 28 delivers a differential amplifier output signal via the output signal line 30. The differential amplifier output signal is a square-wave signal (pulse train with square-wave pulses), which in this case is positive, for example, if the encoder signal A is larger than the inverted encoder signal $\overline{A}$. Otherwise, the differential amplifier output signal is negative. The differential amplifier 28 can reject interference in the encoder signals A, $\overline{A}$, and said signals can be evaluated by an evaluation unit—described below—which is connected to the output signal line 30. The evaluation unit may advantageously have a quadrature decoder, a frequency meter and/or a pulse width meter in order to use the signal changes in the square-wave signal to determine the movement variable, such as the rotational speed and/or position of a shaft.

The measuring units 22, 22' provided in the safety circuits 12, 14 allow the inputs 16, 16' and the output signal lines of the connected encoder which are connected to said inputs to be checked separately.

Since the superposition signal is checked to determine whether it reaches an upper threshold value, is checked to determine whether it reaches a lower threshold value and/or is checked to determine whether it is within a predefined signal level range, it is possible to monitor different encoder signals, such as sinusoidal signals, pulsed signals, square-wave signals, mixed signals, which are formed from a DC component and an AC component, and pure DC signals, which have only a DC component.

In order to increase the electromagnetic compatibility of the safety circuits 12, 14, the taps M, $\overline{M}$ are preferably routed to the ground point GND via a series circuit comprising a diode—not shown—with a Z-diode—not shown. This series circuit results in a very low capacitance, which has a particularly advantageous effect in the case of high cutoff frequencies.

To further increase electromagnetic compatibility, there may preferably be a respective resistor connected between the taps M, $\overline{M}$ and the differential amplifier inputs 26, 32. In addition, each of the differential amplifier inputs 26, 32 can be routed to the ground point GND via a transistor—not shown—and a switchable resistor for the purpose of range switching. This allows the use of operational amplifiers having relatively low maximum voltages, particularly 3.3 volt operational amplifiers.

Figure 2:
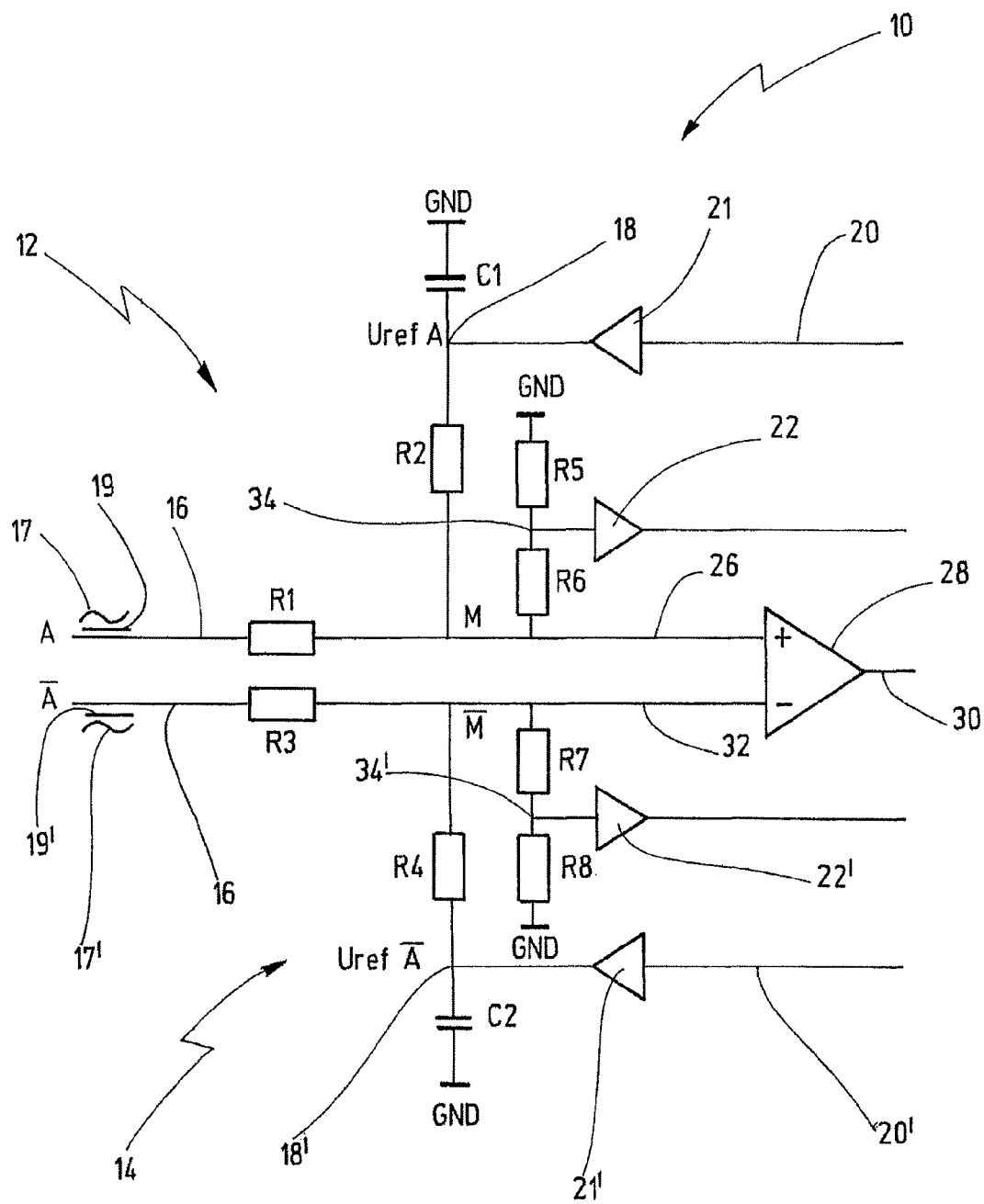
FIG. 2 shows a variant of the safety circuit arrangement shown in FIG. 1.

FIG. 2 shows a variant of the safety circuit arrangement 10. Elements which are the same are denoted by the same reference numerals, with only the differences being discussed below.

The tap M of the safety circuit 12 is routed to the ground point GND via a series circuit comprising a resistor R6 and a resistor R5. The measuring unit 22 is connected to a tap 34 which is situated between the resistor R6 and the resistor R5. The encoder signal A is therefore routed to the ground point GND via a voltage divider comprising R1 with the resistors R5 and R6. This voltage divider allows a further matching of different encoder signals A to the measuring unit 22.

The safety circuit 14 is of identical design to the safety circuit 12 and, in the embodiment shown in FIG. 2, likewise has a voltage divider which is formed by the resistor R3 with resistors R7 and R8 to the ground point GND. The resistors R7 and R8 have a tap or a voltage point 34' formed between them which has the measuring unit 22' connected to it. The resistors R2 and R4 in the embodiments cited above are preferably designed to have high values.

To further increase safety, besides the differential amplifier 28 there may be a further differential amplifier provided which, like the differential amplifier 28, is connected to the differential amplifier inputs 26, 32. An output signal line of the additional differential amplifier is connected to a further evaluation unit in order to assure additional safety.

Figure 3:
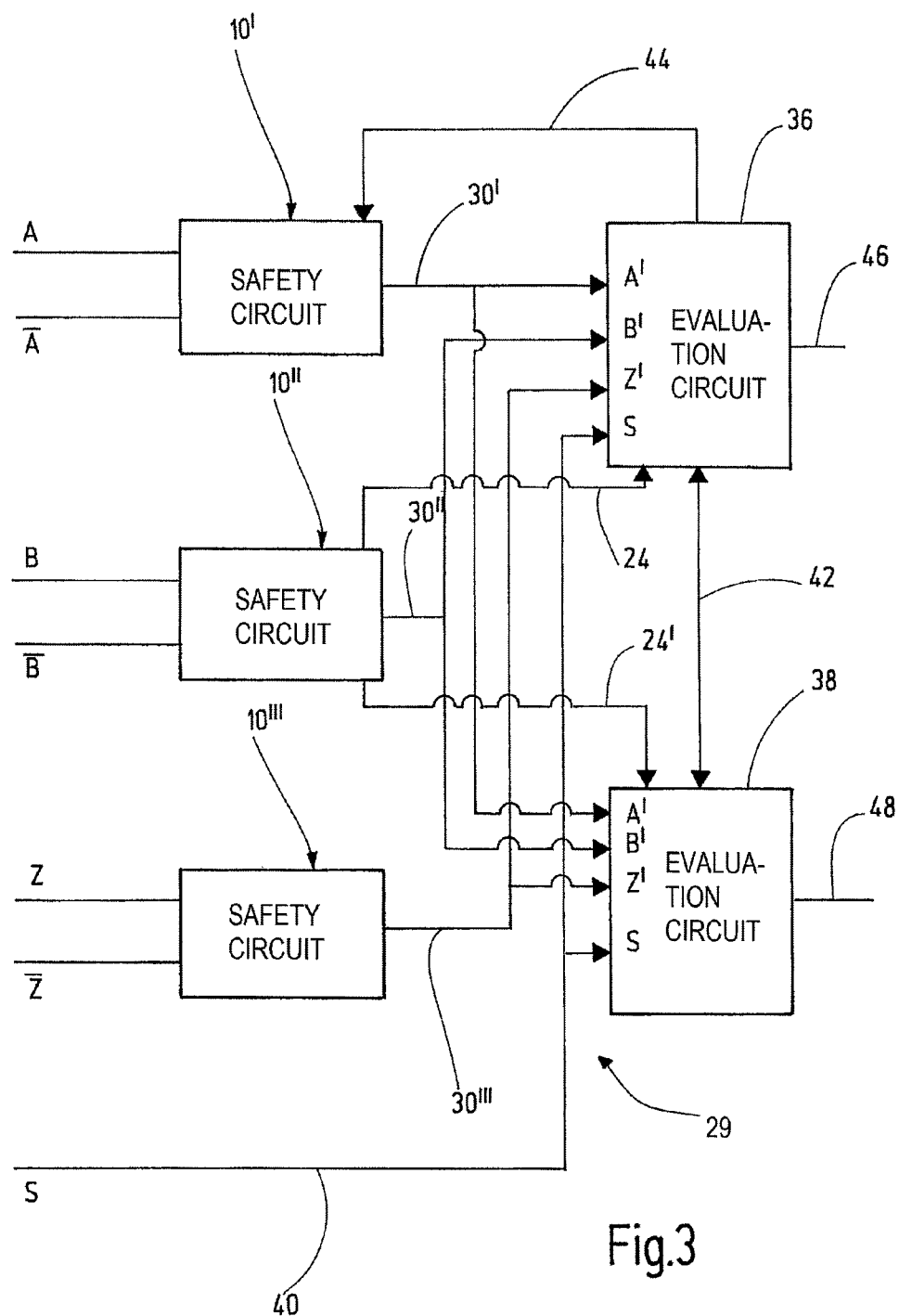
FIG. 3 shows a simplified illustration of a monitoring device in which a plurality of safety circuit arrangements as shown in FIG. 1 or FIG. 2 are used.

FIG. 3 shows a monitoring device having a plurality of safety circuit arrangements 10 for the failsafe evaluation of a plurality of encoder signals. In this case, the monitoring device has three safety circuit arrangements 10 and is denoted as a whole by reference numeral 29. The first safety circuit arrangement 10' is supplied with the encoder signal A and, if present, the encoder signal $\overline{A}$. The second safety circuit arrangement 10'' is supplied with an encoder signal B and, if present, a further encoder signal $\overline{B}$. The third safety circuit arrangement 10''' is supplied with an encoder signal Z and, if present, a further encoder signal $\overline{Z}$. The output signal lines 30', 30'', 30''' of the safety circuit arrangements 10', 10'', 10''' are each connected to a first evaluation circuit 36 and a second evaluation circuit 38. In this case, the encoder signal B is an encoder signal which has a 90° phase shift in comparison with the encoder signal A. Preferably, the encoder signal B is provided by the same encoder as the encoder signal A. In some cases, the encoder signals A and B (and possibly the inverted encoder signals $\overline{A}$, $\overline{B}$) are two "channels" from one incremental encoder. However, the encoder signals A, B may also come from a resolver or else from different encoders.

The inverted encoder signal $\overline{B}$ preferably has a 180° phase shift in comparison with the encoder signal B and is provided by the same encoder as the encoder signal B. The encoder signal Z may likewise be provided by the same encoder as encoder signals A and B. By way of example, the encoder signal Z may be an index signal which represents a reference point on a monitored shaft, so that the encoder signal Z can be used to recognize a reference position for the shaft.

In other cases, the encoder signal Z is provided by a separate encoder which captures the movement variable physically remotely from the first encoder. For example, it is advantageous if the first encoder, which delivers the signals A, B and possibly $\overline{A}$, $\overline{B}$, is arranged at a first end of a rotating shaft, while the second encoder for the Z signal is arranged at a second end of the shaft. Thus, the encoder signals from the two encoders can be used to determine a shaft fracture or the like.

The evaluation circuits 36, 38 are supplied with the output signal A' from the first safety circuit arrangement 10' and with the output signal B' from the second safety circuit arrangement 10'' in order to determine the movement variable to be measured, in particular by means of quadrature evaluation, frequency evaluation and/or pulse length evaluation. In this case, the output signals A', B' are advantageously the output signals from the differential amplifiers 28 in the safety circuit arrangements 10' and 10''.

In preferred exemplary embodiments, the evaluation circuits 36, 38 furthermore receive the error signals from the measuring units 22, 22' in each safety circuit arrangements 10', 10'', 10'''. The output lines 24, 24' of the circuit arrangements 10', 10'', 10''' may therefore be connected to the evaluation circuits 36, 38. This connection is shown in FIG. 3 merely by way of example for the safety circuit 10''.

The output signal for the third safety circuit arrangement 10''' is supplied to the evaluation circuits 36, 38 and is used advantageously either as an index or for shaft fracture recognition. Preferably, the output signal from the third safety circuit arrangement 10''' delivers one or at least one pulse per revolution of the monitored shaft.

In addition, monitoring device 29 in this case also has an "S-channel" 40 which can be used to route an additional analog signal to the evaluation circuits 36, 38 in order to capture an additional measured variable. In preferred cases, the S-channel is connected to the operating voltage line of the encoders used, so that the evaluation circuits 36, 38 can monitor the operating voltage of the encoders used in order to provide an additional safety monitoring.

The evaluation circuits 36, 38 are connected to one another by means of a communication line 42 in order to perform a plausibility comparison. The evaluation circuits have output signal line 46, 48 in order to route the evaluated movement variable and/or control signals to the outside. The communication line 42 may be in two-channel form and may be implemented by two DC-isolated buses and/or two shutdown paths for the monitored shaft, for example.

The quadrature evaluation involves two square-wave signals A', B', which are present on the output signal line 30' of the first safety circuit arrangement 10' and on the output signal line 30" of the second safety circuit arrangement 10", being compared with one another. The output signals are square-wave signals which likewise have a 90° phase shift as a result of the phase shift in the corresponding encoder signals A, B. The quadrature evaluation involves each detected edge of one of the two signals A', B' prompting a check on the polarity of the respective other signal and on the absolute value of the respective other signal. From this information, it is possible to ascertain eight different states or ranges, specifically—for the shaft running to the right—that A' is rising and B' is low, A' is falling and B' is high, B' is rising and A' is high or B' is falling and A' is low, and—for the shaft running to the left—that A' is rising and B' is high, A' is falling and B' is low, B' is rising and A' is low or B' is falling and A' is high. The spacing between the signals can be used to determine a rotary position of the shaft. The quadrature evaluation of two phase-shifted encoder signals A, B makes it possible to attain a fourfold resolution for the rotational speed measurement.

In one particular embodiment, the safety circuit arrangements 10', 10", 10''' have two differential amplifiers 28 which are redundant in respect of one another and the differential amplifier input 26 of which is respectively connected to the tap M, and the differential amplifier input 32 of which is respectively connected to the tap $\overline{M}$. The output signal line 30 of the first differential amplifier 28 is connected to the evaluation circuit 36, and the output signal line 30 of the second differential amplifier 28 is connected to the evaluation circuit 38. This allows additional failsafety to be provided.

The evaluation circuits 36, 38 are preferably implemented by microcontrollers or by other logic circuits, which compare their evaluation results with one another. This comparison is made via the communication line 42. The communication line 42 may be in the form of a bidirectional interface, in the form of a bus connection and/or in the form of a dual-ported RAM. In addition, these evaluation circuits 36, 38 may be designed to adjust the reference voltages UrefA, Uref$\overline{A}$ of the first safety circuit arrangement 10' and the corresponding reference voltages of the second and third safety circuit arrangements 10", 10''', in order to allow automatic matching of the safety circuit arrangements 10', 10", 10''' to an appropriate encoder. In preferred cases, the evaluation circuits 36, 38 adjust the reference voltages on the basis of the level values of the encoder signals. This is indicated by a line 44, by way of example. The resistors R1 to R8 may be adjustable by the microcontrollers in order to allow precise automatic matching to different encoder signals.

The safety circuit arrangement 10 provides a universal encoder connection for the monitoring device 29, said encoder connection allowing connection of TTL encoders, HTL encoders, sin/cos encoders, tacho or dual tacho generators, resolvers and also the connection of analog channels from Hyperface® or EnDat encoders. In this case, it is also possible to connect encoders which do not provide an inverted encoder signal $\overline{A}$, $\overline{B}$, such as initiator encoders. Instead of the inverted signal $\overline{A}$, it is possible in this case to apply a DC voltage to the differential amplifier input 32 or to adjust said DC voltage, specifically preferably to a mean value for the signal at the tap M. In this case, this encoder signal $\overline{A}$ can be customized individually using the reference voltage Uref$\overline{A}$. It goes without saying that in this case the safety circuit 14 needs to be customized appropriately so as not to produce an error signal in the absence of a detected alternating quantity.

In some exemplary embodiments, the safety circuit arrangement 10 may be in the form of a standalone device, in particular in the form of a plug connector. This means that the relevant encoders can be connected to the safety circuit arrangement 10 via input terminals, and the output lines 24, 24' and also the output signal line 30 are routed out of the connector at output terminals. In addition, the reference voltages UrefA, Uref$\overline{A}$ can be supplied to the connector at further input terminals.

In other exemplary embodiments, a complete rotation-speed and zero-speed monitor can be provided as a monitoring device 29, as shown in FIG. 3. In this case, this device has a device housing with terminals for the encoder signals A, $\overline{A}$, B, $\overline{B}$, Z, $\overline{Z}$ and S and outputs the measured rotational speed or movement variable and any error signal. This means that the safety circuits 10', 10", 10''' and the evaluation units 36, 38 are integrated in the device housing. This allows particularly simple integration of this rotation-speed and zero-speed monitor into an existing machine and/or installation.

Figure 4:
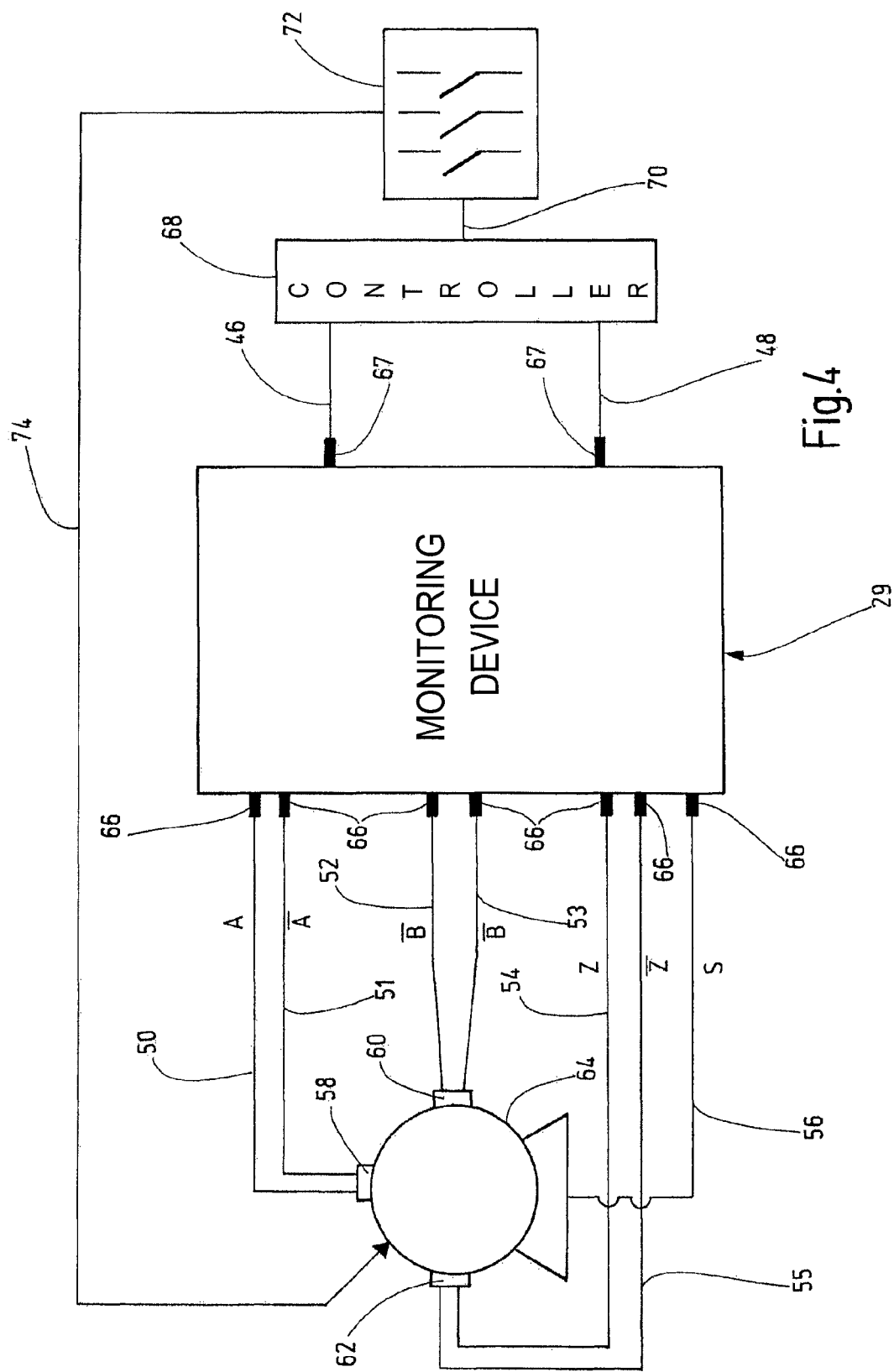
FIG. 4 shows a simplified illustration of an installation with a monitoring device as shown in FIG. 3.

FIG. 4 shows an application of the monitoring device from FIG. 3. In this case, the device 29 is connected to encoders 58, 60, 62 by means of signal lines 50, 51, 52, 53, 54, 55, 56. The encoders 58, 60, 62 are associated with a drive 64 in order to capture a movement variable for the drive 64, such as a rotational speed, position, angular position, inter alia. The signal lines 50 to 56 are connected to the monitoring device 29 via plug contacts 66. The output signal lines 46, 48 are each routed out of the device 29 by means of a plug connector 67 and connected to a controller 68. The controller 68 is preferably a failsafe controller having a plurality of inputs for the connection of emergency-off pushbuttons, guard doors, light barriers and/or the monitoring device 29. In this case, the controller uses an output 70 to produce a control signal for one or more contactors 72. The contactor 72 preferably has a plurality of series-connected contacts (not shown here) which are used for the failsafe shutdown of the drive 64. Accordingly, the contactor 72 is connected to the drive 64 by means of a line 74. In further exemplary embodiments, the controller 68 and/or the contactor 72 may be integrated in the monitoring device 29, i.e. the evaluation circuits 36, 38 of the monitoring device 29 are capable of producing a two-channel shutdown signal for a drive.

What is claimed is:

1. A safety circuit arrangement for failsafe monitoring of a movement variable of a moving machine part, the arrangement comprising:
   a first signal input for supplying a first encoder signal which is representative of the movement variable to be monitored,
   a first reference signal path for supplying a first reference signal,
   a first tap which is connected to the first signal input and to the first reference signal path in order to provide a first superposition signal by superposing the first reference signal on the first encoder signal, and
   a first measuring unit which is connected to the first tap and is designed to generate a first error signal depending on whether the first superposition signal reaches at least one first predefined signal level or is within a first predefined signal level range,
   a second signal input for supplying a second encoder signal which is representative of the movement variable,
   a second reference signal path for supplying a second reference signal,
   a second tap, at which the second reference signal is superposed on the second encoder signal,
   a second measuring unit which is connected to the second tap and is designed to generate a second error signal depending on whether the second superposition signal reaches at least one second predefined signal level or is within a second predefined signal level range, a differential amplifier having a first amplifier input connected to the first tap and having a second amplifier input connected to the second tap, an evaluation unit connected to an output of the differential amplifier for determining the movement variable, and a control unit designed to adjust the first and second reference signals separately from one another.

2. The safety circuit arrangement of claim 1, wherein at least one of the first and second encoder signals comprises an AC signal component.

3. The safety circuit arrangement of claim 1, wherein at least one of the first and second encoder signals comprises a DC signal component.

4. The safety circuit arrangement of claim 1, wherein at least one of the first and second reference signals is a DC voltage.

5. The safety circuit arrangement of claim 1, wherein the first measuring unit comprises an analog comparator.

6. The safety circuit arrangement of claim 1, wherein the control unit is designed to automatically adjust at least one of the first reference signal, the second reference signal, the first predefined signal level, the second predefined signal level, the first signal level range and the second signal level range in response to the first and second encoder signals.

7. The safety circuit arrangement of claim 1, wherein at least one of the first and second reference signals, the first and second predefined signal levels and the first and second signal level ranges is manually adjustable by a user.

8. The safety circuit arrangement of claim 1, wherein the movement variable is one of a rotational speed or a rotational position.

9. The safety circuit arrangement of claim 1, wherein the first predefined signal level or the first signal level range is defined by an upper threshold value and a lower threshold value.

10. The safety circuit arrangement of claim 9, wherein the first measuring unit is designed to generate the first error signal when the upper and lower threshold values are not reached in an alternating manner.

11. A monitoring device for the failsafe monitoring of a movement variable of a moving machine part, comprising a first safety circuit arrangement at least one second safety circuit arrangement, and an evaluation circuit, wherein each of the first and second safety circuit arrangements comprises:

a first signal input for supplying a first encounter signal which is representative of the movement variable to be monitored, a first reference signal path for supplying a first reference signal, a first tap which is connected to the first signal input and to the first reference signal path in order to provide a first superposition signal by superposing the first reference signal on the first encoder signal, and a first measuring unit which is connected to the first tap and is designed to generate a first error signal depending on whether the first superposition signal reaches at least one first predefined signal level or is within a first predefined signal level range, a second signal input for supplying a second encoder signal which is representative of the movement variable, a second reference signal path for supplying a second reference signal, a second tap, at which the second reference signal is superposed on the second encoder signal, a second measuring unit which is connected to the second tap and is designed to generate a second error signal depending on whether the second superposition signal reaches at least one second predefined signal level or is within a second predefined signal level range, and a differential amplifier having a first amplifier input connected to the first tap and having a second amplifier input connected to the second tap, wherein the evaluation circuit is configured to determine the movement variable in response to an output signal from at least one differential amplifier, and wherein the evaluation circuit is further configured to adjust the first and second reference signals in each of the first and second safety circuit arrangements separately from one another.

12. The monitoring device of claim 11, wherein the evaluation circuit is configured to determine the movement variable using a quadrature evaluation of output signals of the differential amplifiers of the first and the at least one second safety circuit arrangements.

13. A method for failsafely monitoring a movement variable of a moving machine part, comprising the steps of:

providing a first encoder signal, which is representative of the movement variable to be monitored, producing a first superposition signal by superposing a first reference signal onto the first encoder signal, checking whether the first superposition signal reaches at least one first predefined signal level or is within a first signal level range and generating a first error signal as a function thereof, providing a second encoder signal, which is representative of the movement variable to be monitored, producing a second superposition signal by superposing a second reference signal onto the second encoder signal, checking whether the second superposition signal reaches at least one second predefined signal level or is within a second predefined signal level range and generating a second error signal as a function thereof, supplying the first superposition signal to a first input of a differential amplifier, supplying the second superposition signal to a second input of the differential amplifier, evaluating an output signal from the differential amplifier in order to determine the movement variable, and adjusting the first and second reference signals separately from one another in order to transform each of the first and second encoder signals to a desired level range.

14. The safety circuit arrangement of claim 1, wherein the control unit is designed to adjust the first reference signal and the second reference signal such that AC components of the first and second superposition signals coincide.

* * * * *